(12) United States Patent
Matsuki et al.

(10) Patent No.: US 10,761,332 B2
(45) Date of Patent: Sep. 1, 2020

(54) LIGHT-GUIDING DEVICE AND DISPLAY DEVICE

(71) Applicant: SEIKO EPSON CORPORATION, Tokyo (JP)

(72) Inventors: Hayato Matsuki, Suwa (JP); Shohei Yoshida, Shimosuwa-machi (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/229,197

(22) Filed: Dec. 21, 2018

(65) Prior Publication Data

US 2019/0196199 A1 Jun. 27, 2019

(30) Foreign Application Priority Data

Dec. 25, 2017 (JP) ................. 2017-247347

(51) Int. Cl.
*G02B 6/42* (2006.01)
*G02B 27/01* (2006.01)
*F21V 8/00* (2006.01)

(52) U.S. Cl.
CPC ....... *G02B 27/0172* (2013.01); *G02B 6/0031* (2013.01); *G02B 6/0086* (2013.01); *G02B 2027/012* (2013.01); *G02B 2027/0178* (2013.01)

(58) Field of Classification Search
USPC ..................................... 385/33–37
See application file for complete search history.

(56) References Cited

U.S. PATENT DOCUMENTS

| | | | |
|---|---|---|---|
| 2010/0067110 A1 | 3/2010 | Hadad et al. | |
| 2010/0202048 A1 | 8/2010 | Amitai et al. | |
| 2014/0118836 A1 | 5/2014 | Amitai et al. | |
| 2015/0234477 A1* | 8/2015 | Abovitz | A63F 13/00 382/103 |
| 2016/0077338 A1* | 3/2016 | Robbins | G02B 27/0172 345/8 |
| 2016/0334625 A1* | 11/2016 | Iba | G02B 27/0172 |
| 2016/0363769 A1* | 12/2016 | Masuda | G02B 6/0038 |
| 2018/0045960 A1* | 2/2018 | Palacios | G02B 27/017 |
| 2018/0232048 A1* | 8/2018 | Popovich | A61B 3/113 |

FOREIGN PATENT DOCUMENTS

| | | |
|---|---|---|
| JP | 2012-198393 A | 10/2012 |
| WO | 2015/076335 A1 | 5/2015 |

* cited by examiner

*Primary Examiner* — Eric Wong
(74) *Attorney, Agent, or Firm* — Oliff PLC (57) ABSTRACT

A light-guiding device according to an aspect of the invention includes an incident section configured to make light incident, a light guide configured to guide the light incident from the incident section, a bonding layer configured to bond the incident section and the light guide, and a reflection member provided on a side surface of the bonding layer.

5 Claims, 9 Drawing Sheets

LIGHT-GUIDING DEVICE AND DISPLAY DEVICE

BACKGROUND

1. Technical Field

The present invention relates to a light-guiding device and a display device.

2. Related Art

In recent years, as a piece of wearable information equipment, a type of image display device such as a head mount display which is used by being worn on a head of an observer has been provided. For example, the following JP-A-2012-198393 discloses an image display device, that is, a so-called see-through type image display device. An observer, when wearing the image display device, is capable of visually recognizing both image light generated by a display element and external light simultaneously.

The above see-through type image display device includes a light-guiding device that guides the image light and the external light into the eye of the observer. The light-guiding device includes an incident section configured to take in the image light and a light guide configured to guide the image light, and the incident section and the light guide are bonded with each other via a bonding layer.

However, in the above image display device, there is a light leakage problem, that is, part of the image light taken in from the incident section is emitted outward from the bonding layer.

SUMMARY

An advantage of some aspects of the invention is to provide a light-guiding device and a display device capable of reducing the occurrence of light leakage.

According to a first aspect of the invention, a light-guiding device is provided that includes an incident section configured to make light incident, a light guide configured to guide the light incident from the incident section, a bonding layer configured to bond the incident section and the light guide, and a reflection member provided on a side surface of the bonding layer.

According to the light-guiding device according to the first aspect, even in a case that light is incident on a side surface at an angle smaller than a predetermined angle (critical angle) with respect to a normal line, it is possible to reflect the light by the reflection member provided on the side surface, and thus to return the light inside the bonding layer. Accordingly, light leakage to the outside of the bonding layer through the side surface is suppressed. This makes it possible to guide quality light without quality deterioration due to the light leakage from the side surface.

In the above aspect, the reflection member preferably includes a part of a holding member configured to hold the light guide.

According to this configuration, since the reflection member includes a part of the holding member configured to hold the light guide, the number of parts may be reduced.

In the above aspect, it is preferable that a light shielding member provided on a surface of the light guide be further included, and the light shielding member shields the light traveling toward the surface without passing through the bonding layer after being reflected by the reflection member.

Here, light incident on a surface of the light guide without passing through the bonding layer after being reflected by the reflection member, is recognized by an observer as light having different overlapping components of an angle of view, since angular components are not maintained. In other words, the light may be a factor for causing a ghost of the image light.

On the other hand, by adopting the above configuration, the light, traveling toward the surface without passing through the bonding layer after being reflected by the reflection member, may be shielded.

Thus, the observer does not recognize the light as different overlapping components of an angle of view. That is, occurrence of the ghost of the image light may be suppressed.

According to a second aspect of the invention, a display device is provided that includes the light-guiding device according to the first aspect, and an image forming unit configured to generate image light to be incident on the incident section.

The display device according to the second aspect allows an observer to visually recognize a quality image without quality deterioration due to the light leakage.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described in detail below with reference to the accompanying drawings.

Note that, in the drawings used for the following descriptions, characteristic portions are expanded for convenience to make characteristics easily comprehensible in some cases, thus dimension ratios among respective constituent elements or the like are not necessarily the same as actual dimension ratios.

First Exemplary Embodiment

An image display device (display device) according to the exemplary embodiment is a see-through type head mount display with which an image and an external world are visible. That is, the display device makes an observer recognize the image as a virtual image, and makes the observer observe the external image as see-through light.

Figure 1:
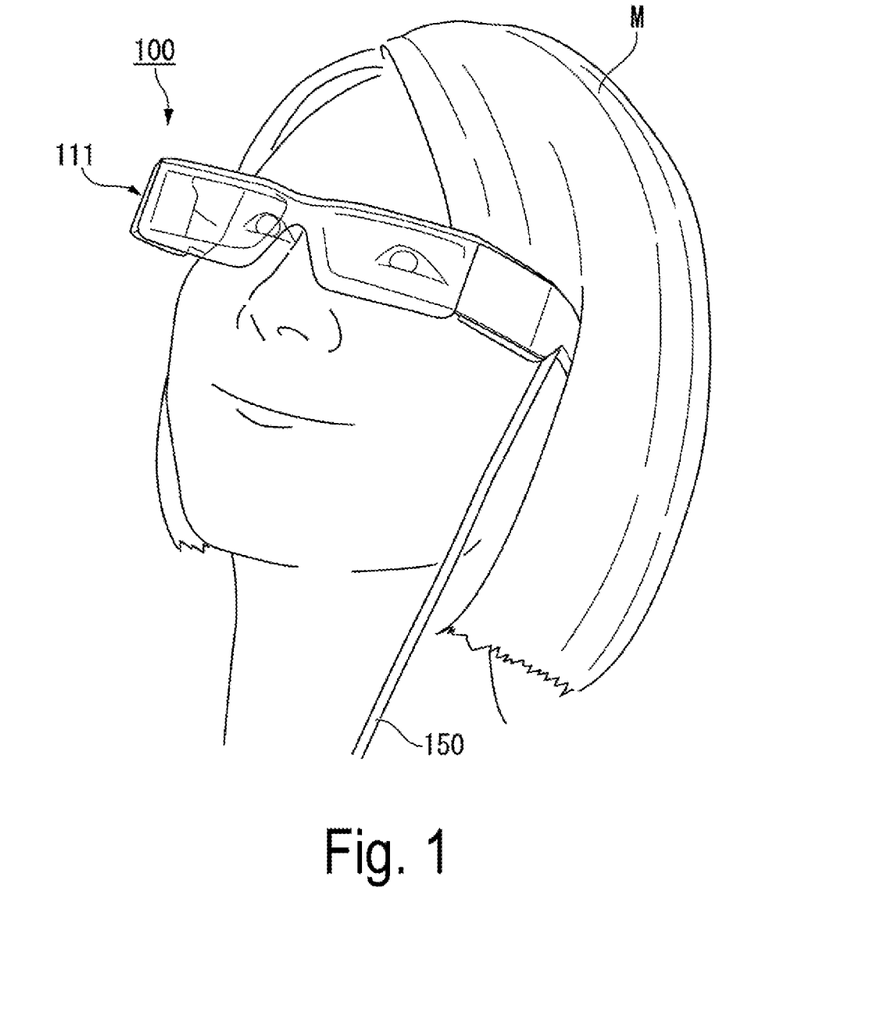
FIG. 1 is a diagram illustrating an observer wearing an image display device according to a first exemplary embodiment.
Figure 2:
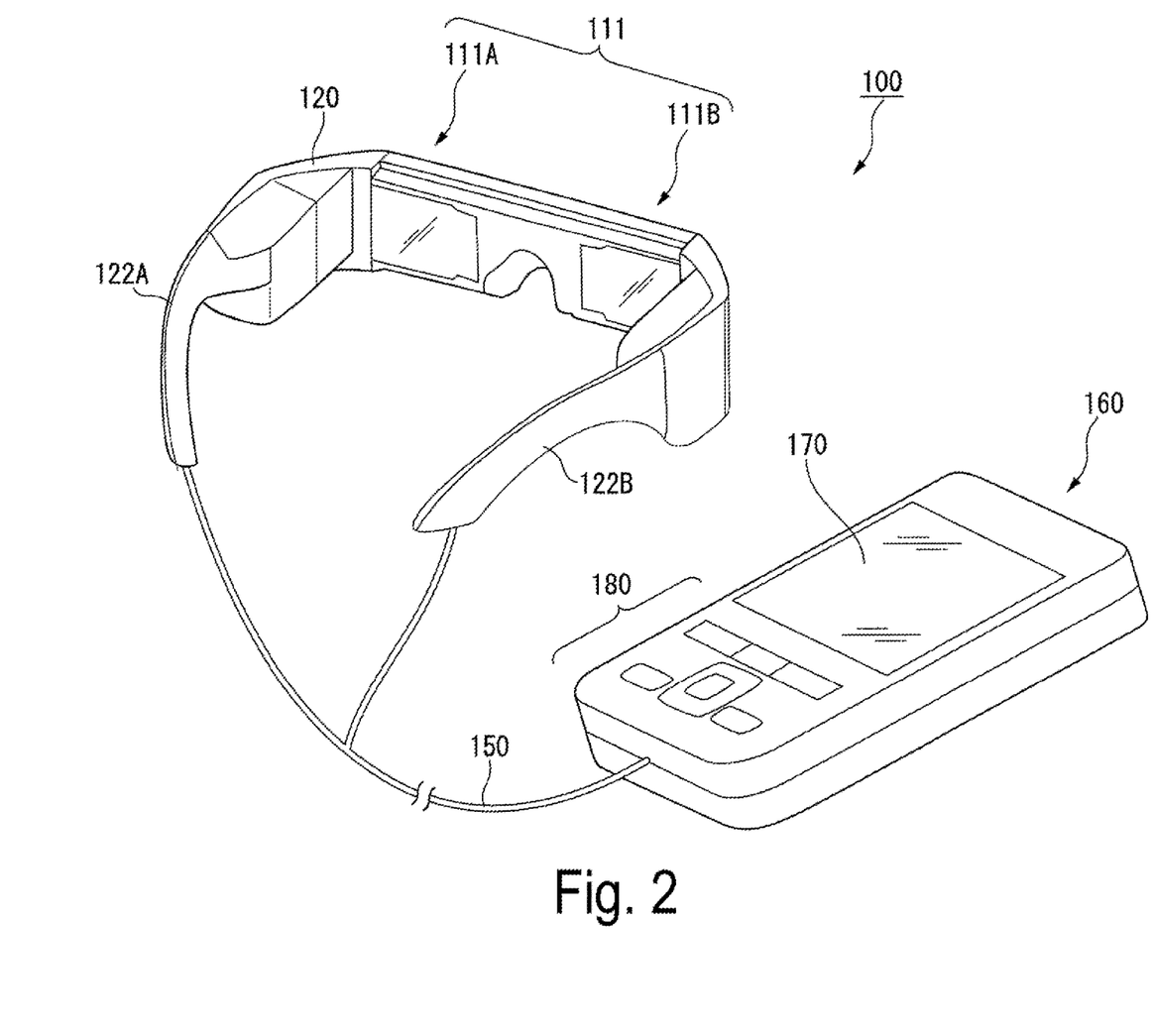
FIG. 2 is a perspective view of the image display device according to the first exemplary embodiment.

FIG. 1 is a diagram illustrating an observer wears an image display device according to the exemplary embodiment. FIG. 2 is a perspective view of the image display device according to the exemplary embodiment.

As illustrated in FIG. 1, an observer M uses an image display device 100 according to the exemplary embodiment, while wearing the device on a head, as in a case of wearing glasses.

As illustrated in FIG. 2, the image display device 100 includes a display unit 111 having a glasses-like shape, and a controller 160 sized suitable for an observer to hold in a hand. The display unit 111 and the controller 160 are communicatively connected with each other, by wire, or wirelessly. In the exemplary embodiment, each of an image display unit for left eye 111A and an image display unit for right eye 111B configuring the display unit 111, and the controller 160 are communicatively connected by wire via a cable 150, and communicate an image signal, a control signal, or the like.

The display unit 111 includes a main frame 120, the image display unit for the left eye 111A, and the image display unit for the right eye 111B. The controller 160 includes a display screen unit 170, and an operation button unit 180.

For example, the display screen unit 170 displays various types of information, instructions, or the like to give to the observer. The main frame 120 includes a pair of temple portions 122A and 122B to hang on ears of the observer. The main frame 120 is a member for supporting the image display unit for the left eye 111A and the image display unit for the right eye 111B.

The image display unit for the right eye 111B and the image display unit for the left eye 111A have similar configurations, and respective constituent elements in both of the display units 111 are symmetrically disposed. Thus, in the following, the image display unit for left eye 111A will be described simply as an image display unit 112 in detail, and a description of the image display unit for right eye 111B will be omitted.

An XYZ coordinate system is used in the following drawings. An X direction corresponds to a front-rear direction for the observer wearing the image display device, a Y direction corresponds to a left-right direction for the observer, a Z direction is a direction perpendicular to the X direction and the Y direction, and corresponds to a top-bottom direction for the observer. In the exemplary embodiment, a −Y direction is referred to as a left direction (left side), a +Y direction is referred to as a right direction (right side), a +X direction is referred to as a forward direction (front or front side), and a −X direction is referred to as a backward direction (rear or rear side) in some cases.

Figure 3:
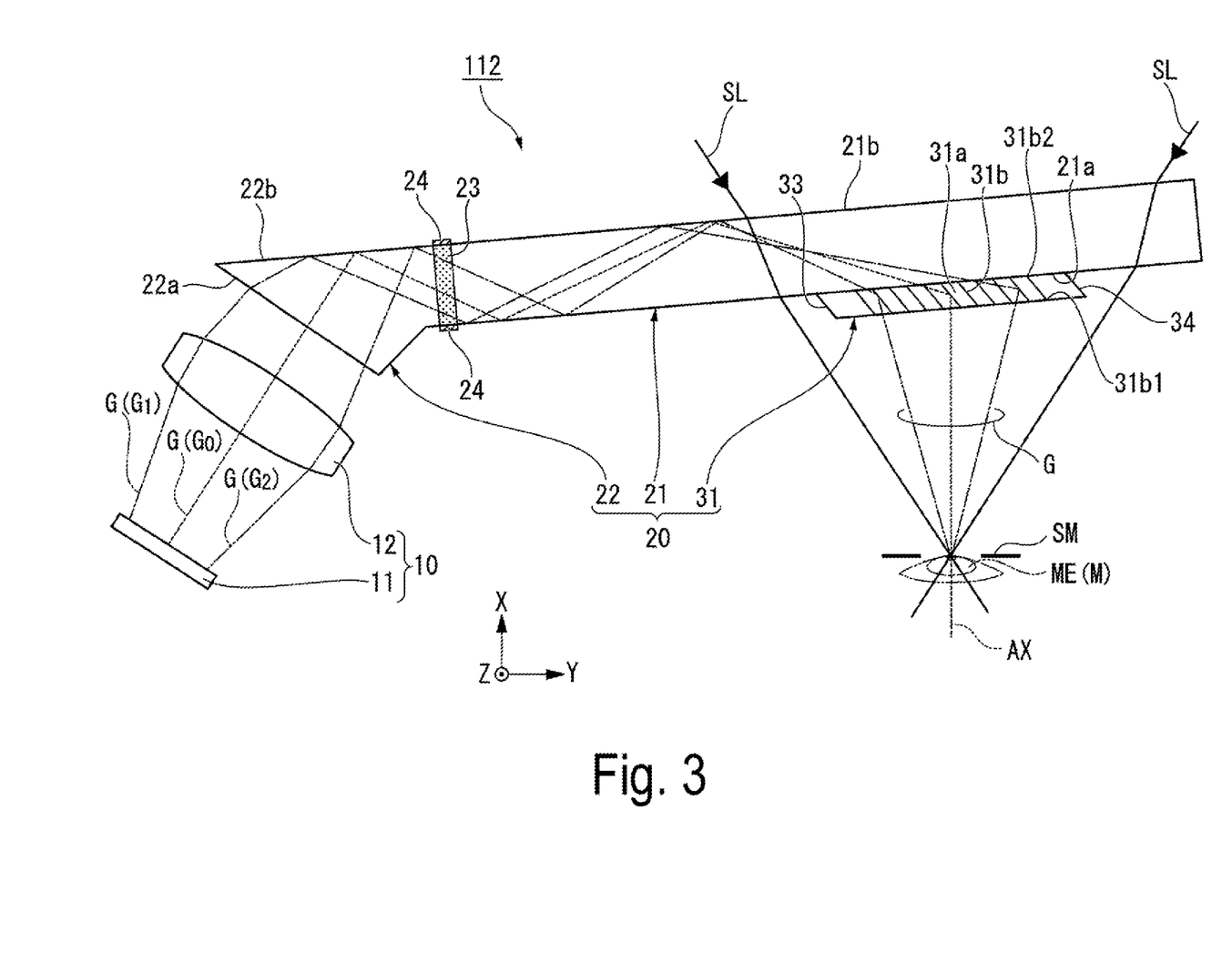
FIG. 3 is a horizontal cross-sectional view illustrating a schematic configuration of an image display unit.
Figure 4:
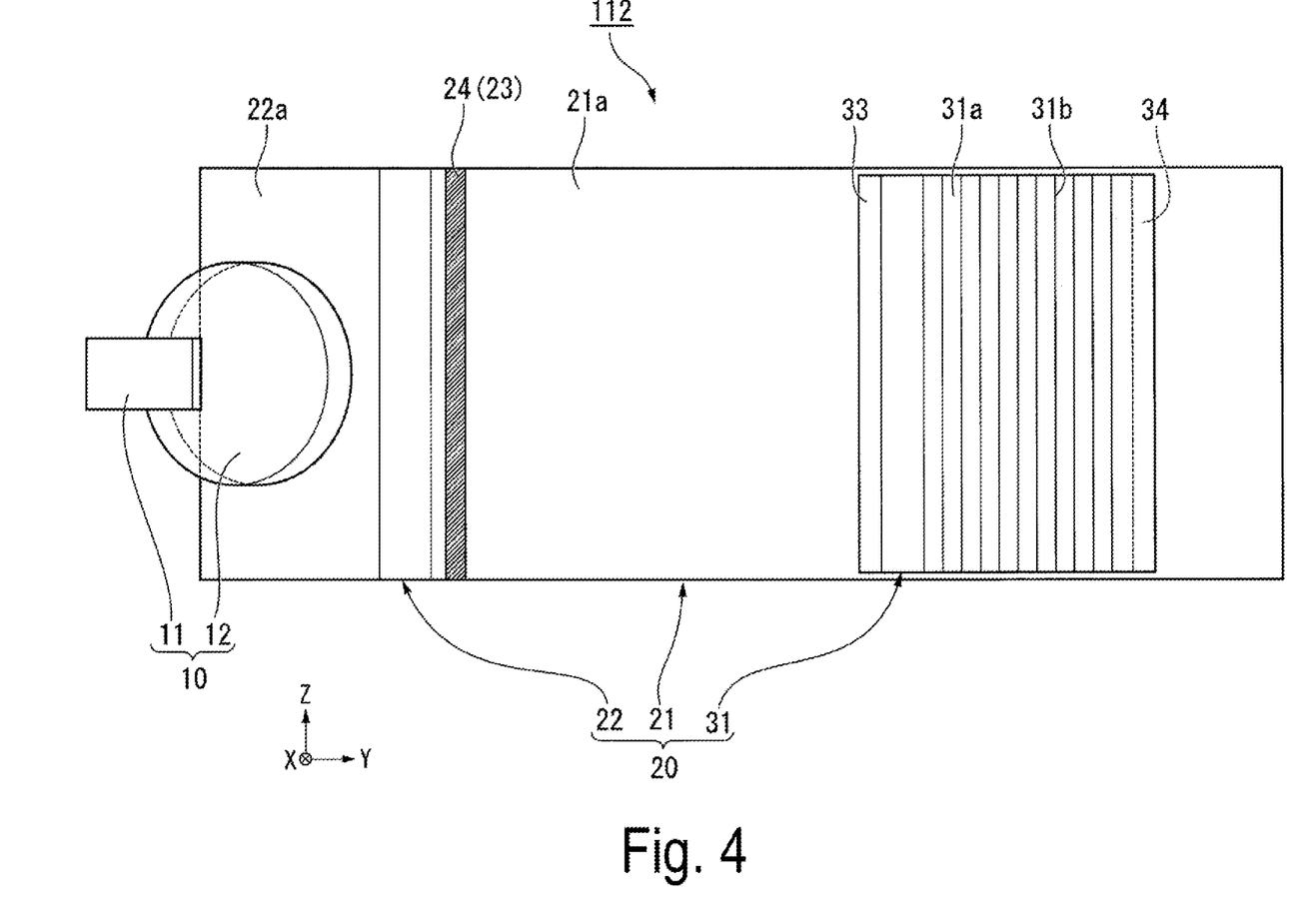
FIG. 4 is a front view viewed from a rear side of the image display unit.

FIG. 3 is a horizontal cross-sectional view illustrating a schematic configuration of the image display unit 112. A cross-section illustrated in FIG. 3 is a cross-section which is parallel to an XY plane. FIG. 4 is a front view viewed from a rear side of the image display unit 112.

As illustrated in FIG. 3 and FIG. 4, the image display unit 112 includes an image forming unit 10 and a light-guiding device 20. The image forming unit 10 includes an image display panel 11 and a projection lens 12. The image display panel 11 includes an image displaying device such as a liquid crystal display panel, an organic EL panel, or the like. The projection lens 12 projects image light G displayed by the image display panel 11 onto an incident section 22 of the light-guiding device 20. The projection lens 12 is formed of glass or plastic, and may include not only a single lens but also a plurality of lenses.

The light-guiding device 20 emits the image light G formed in the image forming unit 10 as virtual image light toward an eye ME of the observer M, while allowing external light corresponding to an external image to pass through as see-through light SL. In the exemplary embodiment, the light-guiding device 20 includes a light guide 21, the incident section 22, and a light extracting unit 31 for extracting the image light G guided inside the light guide 21 to the outside.

The light guide 21 includes a light-guiding member with a plate-shape made of an optically transparent material (e.g., glass). The incident section 22 has a triangular prism shape, and is made of an optically transparent material (e.g., glass). In the exemplary embodiment, respective refractive indices of the light guide 21 and the incident section 22 are substantially identical.

The incident section 22 includes a light incident surface 22a for taking in the image light G from the projection lens 12, and a reflection section 22b for reflecting the image light G taken in and for guiding the image light G into the light guide 21. The reflection section 22b, obtained by forming an aluminum deposition film on surfaces of a prism shape, reflects the incident image light G and bends an optical path of the image light G toward the light guide 21 side. Accordingly, the image light G is incident on the light guide 21 from the incident section 22. Note that it is possible to configure the reflection section 22b by forming not only the aluminum deposition film, but also a silver film, or a laminated film of a silver film and a dielectric multilayer film, in order to change reflectance and to balance colors.

Hereinafter, an optical axis AX is set as an axis that passes through a center of an exit pupil SM. The exit pupil SM is, in an optical design, at a position on which the eye ME of the observer M is placed when the observer M wears the image display device 100.

The light guide 21 is formed as a plate extending in the left-right direction of the observer M (the Y direction in which the eyes are aligned). Specifically, the light guide 21 is disposed to be slightly inclined with respect to the optical axis AX passing through the center of the exit pupil SM. The light guide 21 is inclined to approach backward (the −X direction), that is, to approach the face of the observer M, while proceeding leftward (the −Y direction).

Since the light guide 21 is disposed along a curve of the face of the observer M based on the above configuration, a shape along the curve of the face is also adoptable for the image display unit 112 including the light guide 21. Accordingly, the image display device 100 including the image display unit 112 is also excellent in design.

The light guide 21 includes a pair of a first surface 21a and a second surface 21b parallel with each other. Since the first surface 21a and the second surface 21b are parallel planes, the external image is not expanded and a focus is not shifted.

Each of the first surface 21a and the second surface 21b functions as a totally reflecting surface that totally reflects the image light G propagating inside, and guides the image light G to the light extracting unit 31 with less loss. In the exemplary embodiment, the second surface 21b and the above reflection section 22b form a continuous plane.

The image light G incident on the light guide 21 is totally reflected by being incident on the first surface 21a. And the image light G is incident on the second surface 21b and is totally reflected. The image light G propagates in a direction away from the incident section 22 by being totally reflected at least once between the first surface 21a and the second surface 21b, and reaches the light extracting unit 31.

In the exemplary embodiment, the light-guiding device 20 is designed to avoid occurrence of luminance spots by filling the inside of the light guide 21 with light. Here, "filling the inside of the light guide 21 with light" corresponds to a state in which the image light G emitted from the image display panel 11 fills the inside of the light guide 21 with almost no gaps.

Figure 5:
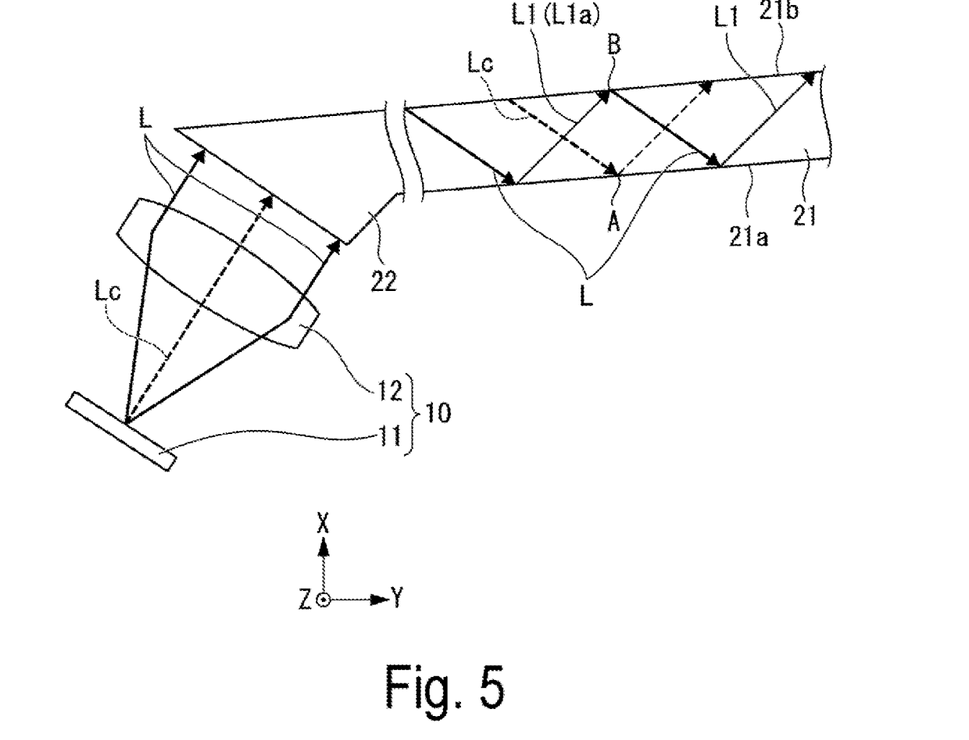
FIG. 5 is a diagram for describing a state in which an inside of a light guide is filled with light.

The state in which the inside of the light guide 21 is filled with light will be described below with reference to FIG. 5. Image light L emitted from a certain pixel of the image display panel 11 is incident on the light-guiding device 20 (light guide 21) in a state of being parallelized by the projection lens 12. In FIG. 5, the Image light L incident on the light guide 21 by being parallelized by the projection lens 12 is schematically illustrated as three beams. Further, in FIG. 5, the image light L after being reflected by the first surface 21a of the light guide 21 is taken as image light L1.

As illustrated in FIG. 5, a position on which a central beam LC of the image light L incident on the light guide 21 via the incident section 22 is reflected by the first surface 21a is taken as a reflection point A. Here, an intersection point of a perpendicular line with respect to the second surface 21b from the reflection point A and the second surface 21b is taken as an intersection point B. At this time, in a case that a beam L1a on the incident section 22 side of the image light L1 is incident on the intersection point B of the second surface 21b, the inside of the light guide 21 is filled with the image light.

The light extracting unit 31 is provided on the first surface 21a of the light guide 21, and extracts the image light G propagating inside the light guide 21 toward the exit pupil SM. The exit pupil SM is positioned on the first surface 21a side of the light guide 21. Note that the light extracting unit 31 is designed to meet predetermined conditions.

The light extracting unit 31 is optically bonded to the first surface 21a of the light guide 21. The light extracting unit 31 includes a plate-shaped member extending in the Y direction along the first surface 21a of the light guide 21.

As illustrated in FIG. 3, the light extracting unit 31 includes a transparent member 31a and a plurality of half mirrors 31b embedded in the transparent member 31a. A refractive index of the transparent member 31a is substantially identical to a refractive index of the light guide 21. This reduces reflection of the image light G at an interface between the light extracting unit 31 and the light guide 21.

Each of the plurality of half mirrors 31b is a member having a long side in the Z direction, and is disposed inside the transparent member 31a at a predetermined pitch. The plurality of half mirrors 31b is disposed in a state of being inclined with respect to the first surface 21a of the light guide 21 such that a front side end 31b2 is closer to the incident section 22 side (−Y side) than a rear side end 31b1. The plurality of half mirrors 31b is disposed to have an identical inclination angle with respect to the first surface 21a. That is, the plurality of half mirrors 31b is disposed to be parallel with one another.

A first edge 33 and a second edge 34 formed on both ends of the light extracting unit 31, and the half mirror 31b are formed to be parallel with one another. The first edge 33 and the second edge 34 correspond to edges positioned on both sides in the left-right direction of the light extracting unit 31 respectively. Specifically, the first edge 33 is an end portion on the incident section 22 side (−Y side), and the second edge 34 is the other end portion on a side (+Y side) opposite to the incident section 22 side.

As describe above, the light extracting unit 31 includes the transparent member 31a and the half mirror 31b. Accordingly, the light extracting unit 31 further makes light incident on the first surface 21a side from the second surface 21b side of the light guide 21 pass through and makes the light incident on the above exit pupil SM. That is, the observer M is capable of observing the external image as the see-through light SL via the light extracting unit 31 and the light-guiding device 20.

Incidentally, in the exemplary embodiment, the light guide 21 and the incident section 22 are bonded via a bonding layer 23. Adhesive force of an adhesive mainly used for an optical member decreases in general as a refractive index of the optical member increases. Thus, in the exemplary embodiment, in order to secure bonding strength between the light guide 21 and the incident section 22, a material having a lower refractive index than a material configuring the light guide 21 and the incident section 22 (glass) is used as the bonding layer 23.

The image display unit 112 according to the exemplary embodiment, as illustrated in FIG. 3, includes a reflection member 24 provided on a side surface 23a of the bonding layer 23. The reflection member 24 includes a metal film such as Ag or Al, for example. Here, the side surface 23a of the bonding layer 23 means a surface different from respective surfaces (bonding surfaces) facing the incident section 22 and the light guide 21 of the bonding layer. That is, the side surface 23a corresponds to a surface of the bonding layer 23, which is exposed to external air.

Figure 6A:
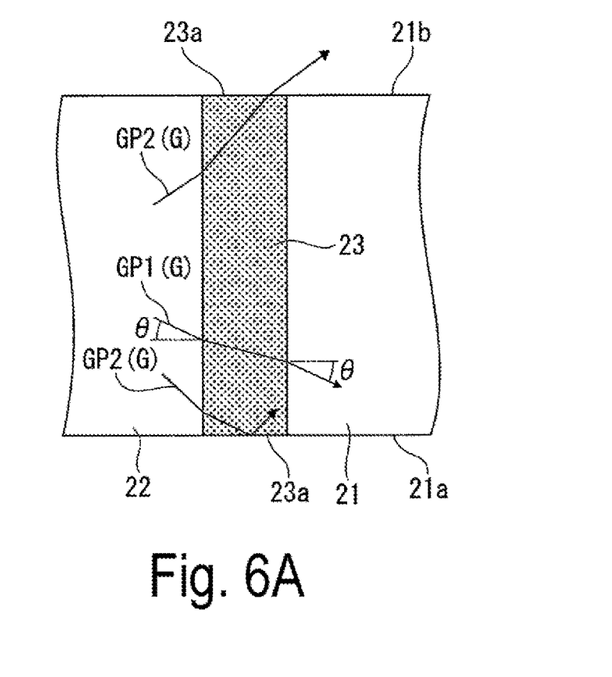
FIG. 6A is a diagram illustrating an optical path of image light in a case that no reflection member is provided as a comparative example.
Figure 6B:
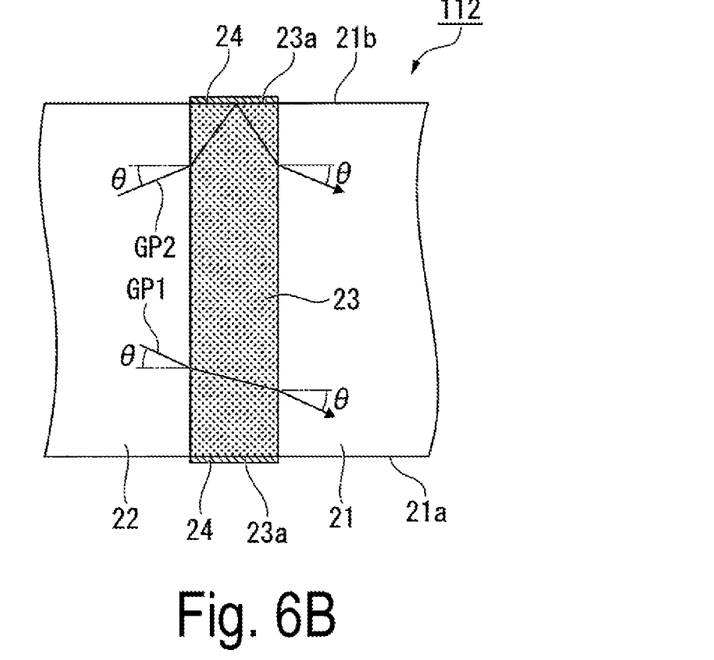
FIG. 6B is a diagram illustrating an optical path of image light in the image display unit according to the exemplary embodiment.

Next, an optical path of the image light G incident on the bonding layer 23 will be described with reference to the drawing. FIG. 6A is, as a comparative example, a diagram illustrating an optical path of the image light G in a case that no reflection member 24 is provided on the side surface 23a of the bonding layer 23. FIG. 6B is a diagram illustrating an optical path of the image light G in the image display unit 112 according to the exemplary embodiment in which the reflection member 24 is provided on the side surface 23a of the bonding layer 23.

As illustrated in FIG. 6A, part of the image light G incident on the bonding layer 23 from an inside of the incident section 22 (hereinafter, referred to as image light GP1) passes through the bonding layer 23 and is incident on the light guide 21. In the exemplary embodiment, since the light guide 21 and the incident section 22 have an identical refractive index, angular components of the image light GP1 (an angle θ with respect to a surface of the bonding layer 23) are maintained (unchanged) before and after passing through the bonding layer 23. Thus, the image light GP1 after passing through the bonding layer 23 is not recognized as different overlapping components of an angle of view by the observer. That is, it is possible to suppress occurrence of a ghost of the image light.

Further, part of the image light G incident on the bonding layer 23 from the inside of the incident section 22 (hereinafter, referred to as image light GP2) is incident on the side surface 23a of the bonding layer 23. The image light GP2 behaves differently depending on a magnitude of an incident angle with respect to the side surface 23a.

Specifically, in a case that the image light GP2 is incident on the side surface 23a in an angle larger than a predetermined angle (critical angle), the image light GP2 is totally reflected by the side surface 23a, is returned inside the bonding layer 23, then passes through inside the bonding layer 23, and is incident on the light guide 21.

Meanwhile, in a case that the image light GP2 is incident on the side surface 23a in an angle smaller than the predetermined angle (critical angle), light leakage occurs in which the image light GP2 passes through the side surface 23a, and is emitted outside the bonding layer 23. Here, the image light GP2 corresponds to a predetermined component of an angle of view of the image light G that contains various components of the angle of view. Since the image light GP2 is not guided to the eye of the observer via the light guide 21, the observer visually recognizes an image with deteriorated quality due to lack of the component of the angle of view corresponding to the image light GP2.

Compared with this, the image display unit 112 according to the exemplary embodiment, as illustrated in FIG. 6B, even in a case that the image light GP2 is incident on the side surface 23a in an angle smaller than the predetermined angle (critical angle), is capable of reflecting the image light GP2 by the reflection member 24 provided on the side surface 23a, and thus returning the image light GP2 inside the bonding layer 23. Accordingly, the occurrence of light leakage in which the image light GP2 passes through the side surface 23a, and is emitted outside the bonding layer 23, is suppressed.

Thus, according to the image display unit 112 according to the exemplary embodiment, it is possible to make the observer visually recognize quality image without quality deterioration due to the light leakage from the side surface 23a.

In the exemplary embodiment, since the reflection member 24 includes a highly light reflective metal film, the image light GP2 is reflected at an interface between the side surface 23a and the reflection member 24, thus passes through the bonding layer 23, and is incident on the light guide 21. As described above, when passing through the bonding layer 23, angular components of the image light GP2 are maintained.

Next, an optical path through which the image light G formed in the image forming unit 10 is incident on the eye ME of the observer M will be described.

In FIG. 3, of the image light G emitted from the image display panel 11, a component that is emitted from a central portion denoted by a dashed line is taken as image light G0, a component denoted by a dashed-dotted line emitted from a left end positioned on a leftmost side of circumference is taken as image light G1, and a component denoted by a dashed-two dotted line emitted from a rightmost end positioned on a rightmost side of the circumference is taken as image light G2. Note that each of the image light G0, G1, and G2 describes part of the entire beam of the image light G, but other beam components configuring the image light G are guided as in the case of the image light G0, G1, and G2, and are emitted from a light emitting surface 31A. Thus, illustrations and descriptions of the other beam components will be omitted.

Each of the image light G0, G1, and G2 after passing through the projection lens 12, is incident from the incident section 22 of the light-guiding device 20 (light incident surface 22a), subsequently goes through the reflection section 22b, passes through the bonding layer 23, and is incident on the light guide 21. As described above, in a case of passing through the bonding layer 23, angular components of the respective image light G0, G1, and G2 do not change, thus the image light G0, G1, and G2 pass through inside the light guide 21, and reach the light extracting unit 31.

Here, an angle in which the image light G is incident on the light extracting unit 31 increases as a distance from the incident section 22 increases. In other words, in a right side of the light extracting unit 31 (far side from the incident section 22), the image light G with large inclination with respect to the optical axis AX is incident and is bent in a relatively small angle, and in a left side of the light extracting unit 31 (near side of the incident section 22), the image light G with small inclination with respect to the optical axis AX is incident and is bent in a relatively large angle.

Specifically, the image light G0 is incident on a central portion of the light extracting unit 31 without being reflected by an interface between the first surface 21a of the light guide 21 and the light extracting unit 31. The image light G0 is reflected in a predetermined angle by the half mirror 31b, and is emitted as parallel beams from the light emitting surface 31A toward the exit pupil SM, along the optical axis AX direction that is inclined in a predetermined angle with respect to a plane including the light emitting surface 31A.

Further, the image light G1 is incident on a portion on the right side (+Y side) of the light extracting unit 31 without being reflected by the interface between the first surface 21a of the light guide 21 and the light extracting unit 31. The image light G1 is reflected by the half mirror 31b in an angle smaller than that of the image light G0, and is emitted as parallel beams from the light emitting surface 31A toward the exit pupil SM.

Similarly, the image light G2 is incident on a portion on the left side (−Y side) of the light extracting unit 31 without being reflected by an interface between the light guide 21 and the light extracting unit 31. The image light G2 is reflected by the half mirror 31b in an angle larger than that of the image light G0, and is emitted as parallel beams from the light emitting surface 31A toward the exit pupil SM.

The image light G incident on the light extracting unit 31 as described above, is bent in a designed angle to be in a state of being extractable toward the exit pupil SM, and is finally incident on the eye ME of the observer M positioned on the exit pupil SM. The image light G emitted from the light extracting unit 31 is incident on the eye ME of the observer M as virtual image light, and the virtual image light forms an image on the retina of the observer M, thus the observer M is capable of recognizing the image formed by the virtual image.

Further, the image display device 100 according to the exemplary embodiment is able to make the observer M observe the external image as the see-through light SL.

According to the image display unit 112 according to the exemplary embodiment, outward leakage of the respective image light G0, G1, and G2 from the side surface 23a of the bonding layer 23 is prevented. Accordingly, the respective image light G0, G1, and G2 are efficiently extracted toward the exit pupil SM via the light extracting unit 31 without leaking from the side surface 23a. Thus, according to the image display device 100 according to the exemplary embodiment including the above-described image display unit 112, it is possible to make the eye ME of the observer M positioned on the exit pupil SM visually recognize quality image without quality deterioration due to the light leakage from the side surface 23a.

Second Exemplary Embodiment

Next, an image display unit according to a second exemplary embodiment will be described. Note that a configuration common to the first exemplary embodiment will be given an identical reference numeral and detail description will be omitted.

Figure 7:
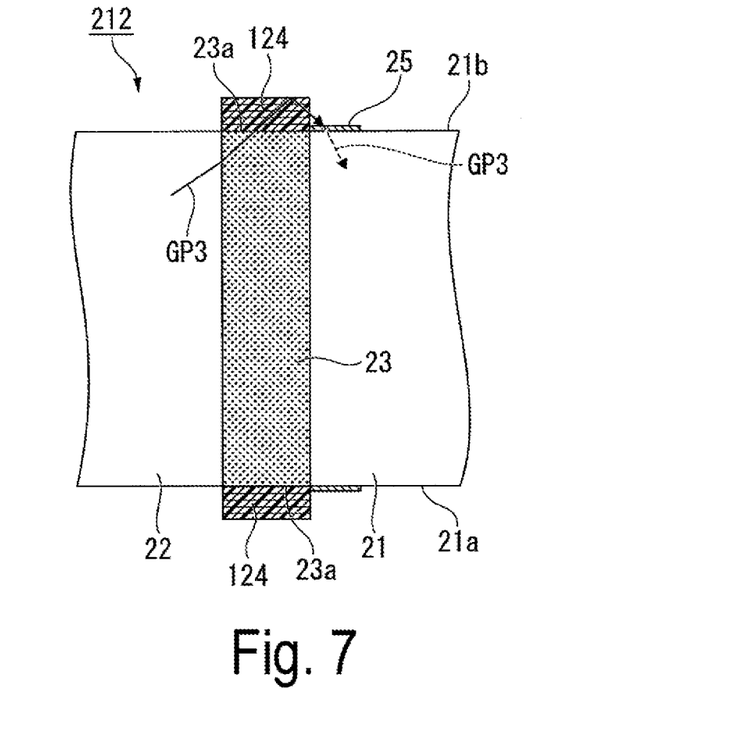
FIG. 7 is a horizontal cross-sectional view illustrating a schematic configuration of an image display unit according to a second exemplary embodiment.

FIG. 7 is a horizontal cross-sectional view illustrating a schematic configuration of an image display unit 212 according to the exemplary embodiment. Note that a cross-section illustrated in FIG. 7 is a cross-section obtained by being cut with a plane parallel to the XY plane.

As illustrated in FIG. 7, the image display unit 212 according to the exemplary embodiment includes a reflection member 124 provided on the side surface 23a of the bonding layer 23. In the exemplary embodiment, the reflection member 124 includes a dielectric multilayer film, for example.

Further, the image display unit 212 according to the exemplary embodiment further includes a light shielding member 25 provided on the first surface 21a and the second surface 21b (surfaces) of the light guide 21.

Also in the image display unit 212 according to the exemplary embodiment, as in the case of the first exemplary embodiment, it is possible to reflect the image light G by the reflection member 124 to return the image light G into the bonding layer 23. This makes it possible to suppress the occurrence of light leakage from the side surface 23a.

On the other hand, since the reflection member 124 according to the exemplary embodiment includes the dielectric multilayer film, part of the image light G incident on the bonding layer 23 from inside the incident section 22 (hereinafter, referred to as image light GP3) is not reflected at an interface between the reflection member 124 and the side surface 23a, and is reflected at a lower layer side of the reflection member 124 in some cases.

As illustrated in FIG. 7, the image light GP3 reflected inside the reflection member 124 (the lower layer side) does not return inside the bonding layer 23, and if the light shielding member 25 is not provided, as denoted by a dashed line in FIG. 7, is directly incident on a surface (the second surface 21b) of the light guide 21. Angular components of the image light GP3 directly incident on the second surface 21b, unlike the case of passing through inside the bonding layer 23 and being incident on the light guide 21, are not maintained (change). Thus, the image light GP3 is recognized as light having different overlapping components of an angle of view by the observer, and is possibly a factor for causing a so-called ghost of the image light.

Compared with this, in the image display unit 212 according to the exemplary embodiment, it is possible to shield the image light GP3, incident on a surface (the second surface 21b) without passing through the bonding layer 23 after being reflected by the reflection member 124, by the light shielding member 25. Thus, the image light GP3 is shielded by the light shielding member 25, so that the observer does not recognize the image light GP3 as different overlapping components of an angle of view. That is, it is possible to suppress occurrence of a ghost of the image light.

According to the image display unit 212 according to the exemplary embodiment, including the light shielding member 25 makes it possible to suppress the occurrence of a ghost in a case of using the dielectric multilayer film as the reflection member 124. Thus, it is possible to make the observer visually recognize quality image while suppressing quality deterioration due to the light leakage from the side surface 23a, and the occurrence of a ghost.

Third Exemplary Embodiment

Next, an image display unit according to a third exemplary embodiment will be described. Note that a configuration common to the first exemplary embodiment will be given an identical reference numeral and detail description will be omitted.

Figure 8:
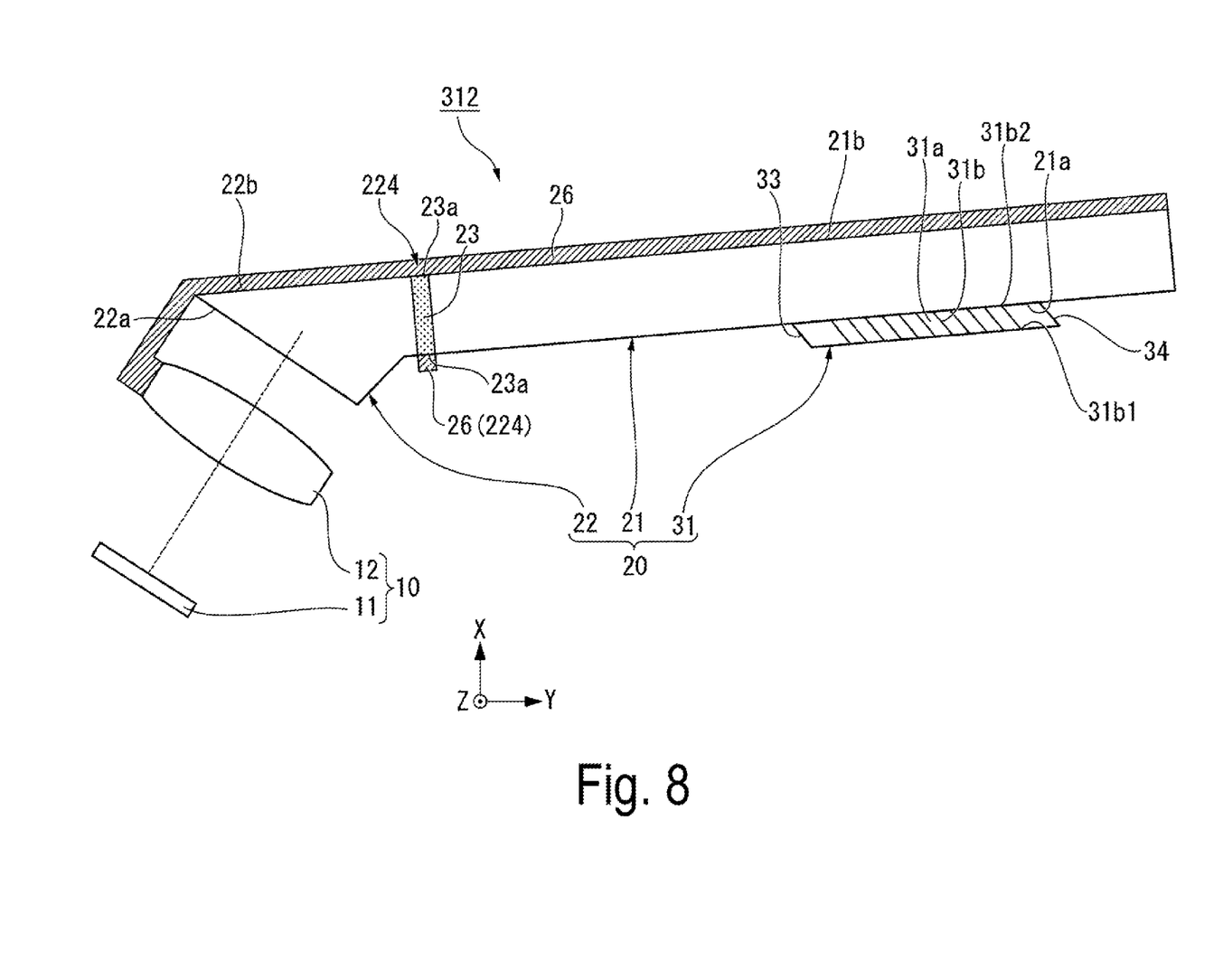
FIG. 8 is a horizontal cross-sectional view illustrating a schematic configuration of an image display unit according to a third exemplary embodiment.
Figure 9:
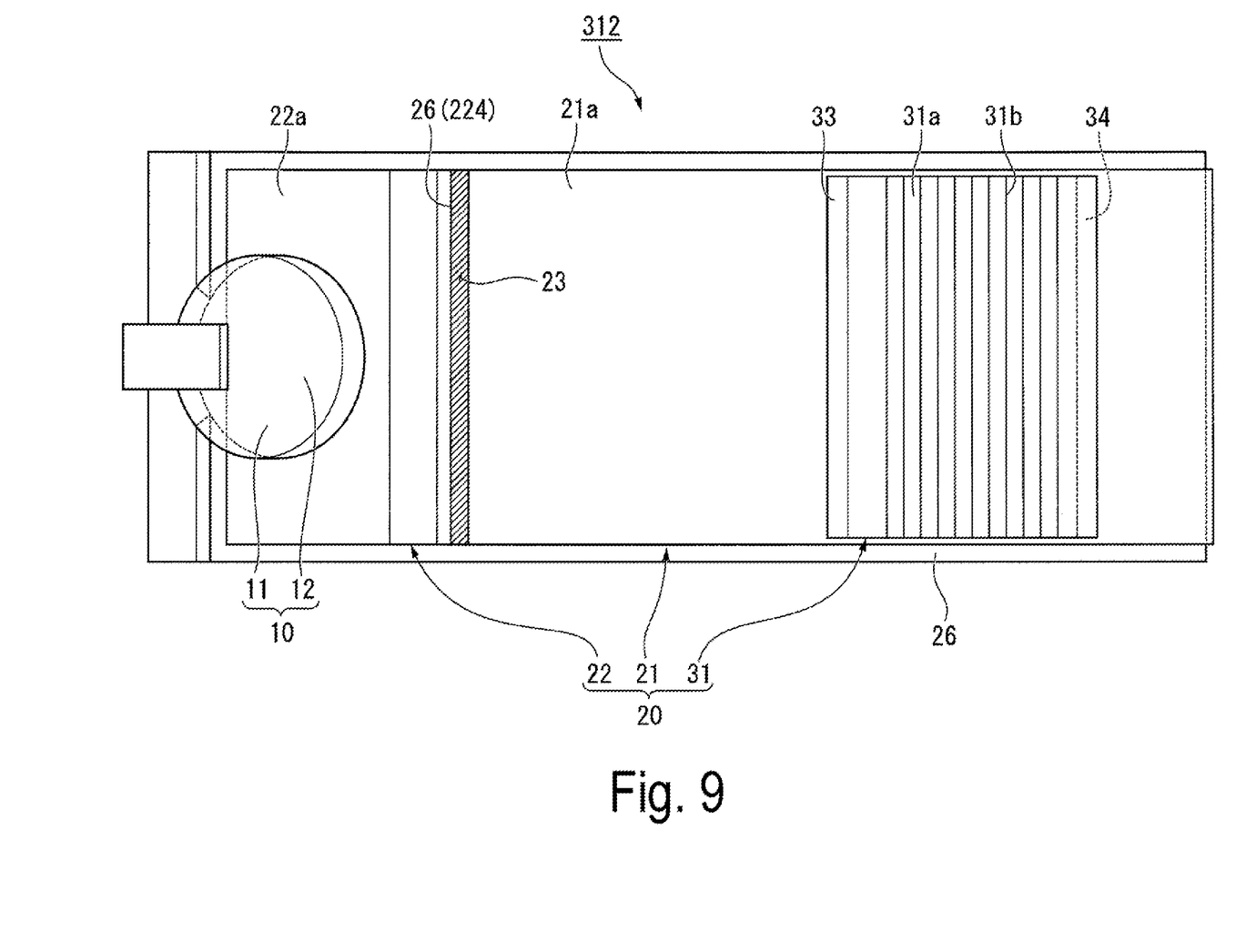
FIG. 9 is a front view viewed from a rear side of the image display unit according to the third exemplary embodiment.

FIG. 8 is a horizontal cross-sectional view illustrating a schematic configuration of an image display unit 312 according to the exemplary embodiment. A cross-section illustrated in FIG. 8 is a cross-section obtained by being cut with a plane parallel to the XY plane. FIG. 9 is a front view viewed from a rear side of the image display unit 312.

As illustrated in FIG. 8 and FIG. 9, the image display unit 312 according to the exemplary embodiment includes the image forming unit 10, the light-guiding device 20, and a frame member (holding member) 26. The frame member 26 is a member for integrally holding the projection lens 12 configuring the image forming unit 10 and the light-guiding device 20. The frame member 26 improves mechanical strength of the image display unit 312 by integrally holding the projection lens 12 and the light-guiding device 20. Note that the frame member 26 may be configured to integrally hold the image display panel 11 configuring the image forming unit 10.

In the exemplary embodiment, since the frame member 26 surrounds circumference of the light-guiding device 20 in a frame shape, the light guide 21 and the incident section 22 are tightly held by the frame member 26. In the exemplary embodiment, as the bonding layer 23 for bonding the light guide 21 and the incident section 22, one that has weak adhesive force is usable. That is, in the exemplary embodiment, since the bonding strength between the light guide 21 and the incident section 22 is secured by the frame member 26, a material having a refractive index as low as that of the material configuring the light guide 21 and the incident section 22 (glass) is usable as the bonding layer 23.

According to the configuration, a difference in a refractive index between the light guide 21 and the bonding layer 23 and a difference in a refractive index between the incident section 22 and the bonding layer 23 decrease. This makes it possible to reduce a loss of light due to refraction and reflection at each of an interface between the light guide 21 and the bonding layer 23, and an interface between the incident section 22 and the bonding layer 23. As a result, it is possible to efficiently guide the image light to the eye of the observer.

Further, the image display unit 312 according to the exemplary embodiment includes a reflection member 224 provided on the side surface 23a of the bonding layer 23. In the exemplary embodiment, the reflection member 224 includes a part of the frame member 26. That is, the reflection member 224 includes a portion extending from the frame member 26. In the exemplary embodiment, the frame member 26 includes a light reflective metal member such as Al, for example. Accordingly, the frame member 26 is able to configure the reflection member 224. According to this configuration, since the reflection member 224 includes a part of the frame member 26 for holding the light guide 21, it is possible to reduce the number of parts.

Note that the frame member 26 may not be entirely formed of a light reflective member. That is, for example, by selectively providing a reflection film at a predetermined portion of the frame member 26 made of an optical transparent member, the portion provided with the reflection film may be made to function as the reflection member 224.

Hereinbefore, an exemplary embodiment of the invention is described, but the invention is not limited to contents of the above exemplary embodiment, and is appropriately changeable without departing from the gist of the invention.

For example, in the above exemplary embodiment, as the incident section 22, one that guides the image light G into the light guide 21 by reflecting the light is adopted. In other words, although the incident section 22 utilizing a reflection phenomenon of the image light G is cited as an example, an incident section for taking light into the light guide 21 using a refraction phenomenon of light may be adopted.

Figure 10:
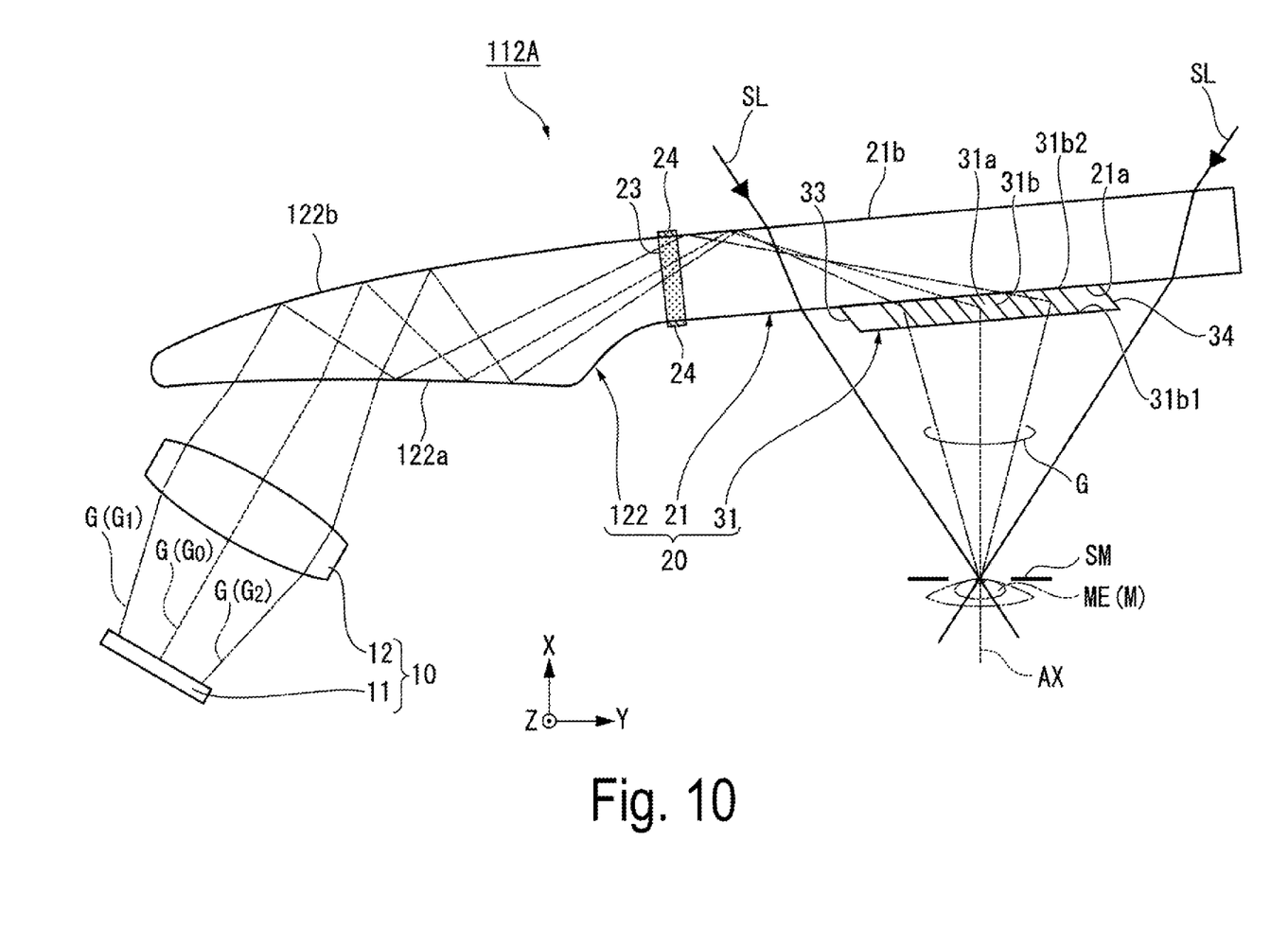
FIG. 10 is a horizontal cross-sectional view illustrating a schematic configuration of an image display unit according to a modification.

Further, an incident section using a free-form surface may be adopted. As illustrated in FIG. 10, an incident section 122 of an image display unit 112A according to a modification includes a light incident surface 122a for taking in the image light G from the projection lens 12, and a reflection surface 122b for reflecting the image light G taken in and for guiding the image light G into the light guide 21. The light incident surface 122a is formed of a free-form surface concave toward the projection lens 12 side. The free-form surface also has a function for totally reflecting the image light G reflected by the reflection surface 122b, on an inner surface side.

The reflection surface 122b is formed of a free-form surface concave toward the projection lens 12 side. The reflection surface 122b includes a metal film such as an aluminum film deposited on the free-form surface by using a vapor deposition method or the like. The reflection surface 122b reflects the image light G incident from the light incident surface 122a, and bends an optical path.

The light incident surface 122a totally reflects in an inner side, the image light G reflected by the reflection surface 122b, and bends an optical path. As described above, the incident section 122 reflects the image light G incident from the light incident surface 122a twice, and bends the optical paths to securely guide the image light G into the light guide 21.

In the modification, the light incident surface 122a and the reflection surface 122b including the free-form surface also perform part of a function of the projection lens 12 (beam parallelizing function). Thus, in the modification, the image light G is incident on the light guide 21 in a state of being parallelized by being emitted from the incident section 122.

Further, in the above exemplary embodiment, the light extracting unit 31 is disposed on the first surface 21a side of the light guide 21, but may be disposed on the second surface 21b side.

In the above exemplary embodiment, as the image display device 100, the configuration in which the pair of image display units 111A and 111B corresponding to the right eye and the left eye respectively is provided, is cited as an example. However, the exemplary embodiment may be applied to a configuration in which the image display unit is provided for one of the right eye and the left eye only to visually recognize an image with one eye, that is, an image display device for one eye.

Further, in the above-described exemplary embodiment, the specific descriptions are given assuming that the image display device is the head mount display, but the display device according to an aspect of the invention is applicable to a head-up display, a binocular type handheld display, and the like.

The entire disclosure of Japanese Patent Application No. 2017-247347, filed Dec. 25, 2017 is expressly incorporated by reference herein.

What is claimed is:

1. A light-guiding device, comprising:
    an incident section configured to make light incident;
    a light guide configured to guide the light incident from the incident section;
    a bonding layer configured to bond the incident section and the light guide; and
    a reflection member provided on both side surfaces of the bonding layer, the side surfaces of the bonding layer being surfaces facing each other in a front-rear direction when the light-guiding device is worn by a user.

2. The light-guiding device according to claim 1, wherein the reflection member includes a part of a holding member configured to hold the light guide.

3. The light-guiding device according to claim 1, further comprising:
    a light shielding member provided on a surface of the light guide, wherein
    the light shielding member shields the light traveling, without passing through the bonding layer, toward the surface after being reflected by the reflection member.

4. A display device, comprising:
    the light-guiding device according to claim 1; and
    an image forming unit configured to generate image light to be incident on the incident section.

5. The light-guiding device according to claim 1, wherein the bonding layer comprises a material having a lower refractive index than a material configuring the incident section and a material configuring the light guide section.

* * * * *